(12) United States Patent
Sprljan et al.

(10) Patent No.: US 8,731,066 B2
(45) Date of Patent: May 20, 2014

(54) MULTIMEDIA SIGNATURE CODING AND DECODING

(75) Inventors: Nikola Sprljan, Guildford (GB); Paul Brasnett, Surbiton (GB); Stavros Paschalakis, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 683 days.

(21) Appl. No.: 12/897,546

(22) Filed: Oct. 4, 2010

(65) Prior Publication Data

US 2011/0080958 A1 Apr. 7, 2011

(30) Foreign Application Priority Data

Oct. 5, 2009 (GB) .................................. 0917417.8

(51) Int. Cl.
*H04N 7/12* (2006.01)

(52) U.S. Cl.
USPC .................................................. 375/240.25

(58) Field of Classification Search
USPC .................................................. 375/240.25
See application file for complete search history.

(56) References Cited

U.S. PATENT DOCUMENTS

| | | | | |
|---|---|---|---|---|
| 8,156,132 B1 * | 4/2012 | Kaminski, Jr. | ................ | 707/758 |
| 8,290,918 B1 * | 10/2012 | Ioffe | ............................ | 707/698 |
| 8,326,775 B2 * | 12/2012 | Raichelgauz et al. | .......... | 706/10 |
| 8,351,643 B2 * | 1/2013 | Radhakrishnan et al. | .... | 382/100 |
| 2011/0142348 A1 * | 6/2011 | Radhakrishnan et al. | .... | 382/195 |

FOREIGN PATENT DOCUMENTS

| | | |
|---|---|---|
| EP | 1640913 A1 | 3/2006 |
| EP | 1640914 A2 | 3/2006 |
| WO | WO 2008/044026 A1 | 4/2008 |

OTHER PUBLICATIONS

H. Samet, "Foundations of Multidimensional and Metric Data Structures", Morgan Kaufmann, 2006, Section 4.7.4, pp. 711-716.
J. Sivic et al., "Efficient Visual Search for Objects in Videos", Proceedings of the IEEE, vol. 96, No. 4, Apr. 2008, pp. 548-566.

(Continued)

*Primary Examiner* — Anner Holder
(74) *Attorney, Agent, or Firm* — Birch, Stewart, Kolasch & Birch, LLP (57) ABSTRACT

A method and apparatus for coding and decoding the fingerprint of a multimedia item such as video or audio is disclosed. A multimedia content temporal, such as a video segment or audio segment, is described by a coarse fingerprint and a plurality of fine fingerprints, each fine fingerprint corresponding to a temporal sub-interval of said temporal interval, said temporal sub-interval typically being smaller than said temporal interval. One or more fine fingerprints are encoded in a non-predictive way, with no reference to the temporally neighboring signatures, and one or more fine fingerprints are encoded in a predictive way, from the temporally neighboring signatures. The predictive encoding entails computing the difference between neighboring fine fingerprints to make up a prediction difference matrix, scanning said prediction difference matrix into a one dimensional vector by vectorising along rows or along columns or along diagonals or along any suitable scanning pattern, and performing lossless encoding on the one dimensional vector by an appropriate method, preferably selected, at least in part, based on the scanning method used.

35 Claims, 6 Drawing Sheets

(56) References Cited

OTHER PUBLICATIONS

M. van Ginkel et al., "A short introduction to the Radon and Hough transforms and how they relate to each other", No. QI-2004-01 in the Quantitative Imaging Group Technical Report Series, Delft University of Technology.

Ondrej Chum et al., "Scalable Near Identical Image and Shot Detection", Proceedings of the 6th ACM international conference on Image and Video Retrieval, Amsterdam, The Netherlands, 2007, pp. 549-556.

T. Hoad et al., "Fast Video Matching with Signature Alignment", Proceedings of the 5th ACM SIGMM international workshop on Multimedia Information Retrieval, Berkeley, California, USA, 2003, pp. 262-269.

T. Hoad et al., "Video Similarity Detection for Digital Rights Management", In Proceedings of Australasian Computer Science Conference, Adelaide, Australia, 2003, pp. 237-245.

"Information technology—Multimedia content description interface—Part 3: Visual, Amendment 4: Video signature tools", ISO/IEC TC JTC1/SC 29, ISO/IEC 15938-3:2002/FDAM 4:2010(E), Apr. 23, 2010, pp. 1-46.

Brasnett et al., "Study of Working Draft 15938-3:2002/Amd.4 Video Signature Tools", International Organisation for Standardisation, ISO/IEC JTC1/SC29/WG11, MPEG2009/M16698, Jul. 2009, pp. 1-24.

Sullivan et al., "Video Compression-From Concepts to the H.264/AVC Standard", Proceedings of the IEEE, vol. 93, No. 1, Jan. 2005, pp. 18-31.

* cited by examiner

MULTIMEDIA SIGNATURE CODING AND DECODING

RELATED APPLICATIONS

The present application claims priority from UK patent application number GB 0917417.8 filed on 5 Oct. 2009, which is hereby incorporated by reference herein in its entirety.

FIELD OF THE INVENTION

The present invention relates to the coding and decoding of the signature or fingerprint of a multimedia item such as video or audio.

BACKGROUND TO THE INVENTION

Multimedia fingerprints (also commonly referred to as signatures or robust hashes) have been proposed as a way to uniquely identify multimedia content (audio, images and video). A typical fingerprinting method applies signal processing techniques to multimedia content to extract descriptors. These descriptors may represent spatial information at temporal sample points, temporal information and/or spatio-temporal. The descriptors are typically high dimensional vectors of features that may be quantised to a small number of values, e.g. two (binary), three (ternary), four (quaternary), etc. The descriptors may also be projected into some lower dimension space, for example by Singular Value Decomposition (SVD). The important characteristics used to differentiate between different multimedia fingerprinting methods include uniqueness, robustness, descriptor size, searching speeds and temporal granularity.

Video fingerprints extracted by previous methods either sample every frame, sample at some known period or sample at temporal locations believed to have some significance (e.g. key frames). Sampling at every frame leads to large fingerprints, making storage and transmission costs high. Sampling at lower intervals leads to smaller fingerprints; however there is a loss in the temporal granularity that the method is able to achieve. It will be clear to those skilled in the art that similar limitations exist for audio fingerprints.

Lossless encoding schemes typically employ some combination of run-length coding and variable length prefix coding. For instance, lossless encoding has application in the coding of fax machine messages and compression of digital image file formats. The prefix property of the coding system refers to the fact that there is no codeword with a prefix that is equal to some other codeword. The Huffman codes constitute one particular example, where the codeword length is chosen adaptively, in accordance with the probability of the encoded symbol. To achieve the optimal entropy limit for a specific set of symbols, the codewords need to be of length $l_i = -\log_2 p_i$, where $p_i$ is the probability of the i-th symbol. However, when the probabilities are known by the encoder (transmitter), but not by the decoder (receiver), Huffman coding requires an overhead of signalling assignment of a particular codeword to a particular symbol. This may be done with a small number of bits if several predetermined probability tables are used, so only an index to a table is transmitted. Another variant of variable length coding, arithmetic coding, can achieve the optimal codeword length for the case where the probabilities of symbols correspond to non-integer codeword lengths. Arithmetic coding is in general more complex than Huffman coding, which is in turn more complex than the universal codes, where the set of the codewords is fixed. Universal codes have the property that for monotonically decreasing distributions ($p_i \geq p_{i+1}$) the expected codeword lengths are longer by a constant factor than the optimal codeword lengths. One commonly used universal code is Exponential-Golomb (also known as Exp-Golomb), that performs well for exponential probability distributions that have wide tails (relatively large probability for symbols with large index i). The codes are parameterised by a non-negative integer s, with the codewords of length $l_i = 1 + 2\lfloor \log_2(i+2^s) \rfloor - s$. The first eight codewords for s=0, 1, 2 are shown in Table 1 below.

TABLE 1

Exponential-Golomb codewords and the corresponding bit-lengths

| i | s = 0 | s = 1 | s = 2 |
|---|-------|-------|-------|
| 0 | 1(1) | 00(2) | 000(3) |
| 1 | 010(3) | 01(2) | 001(3) |
| 2 | 011(3) | 1000(4) | 010(3) |
| 3 | 00100(5) | 1001(4) | 011(3) |
| 4 | 00101(5) | 1010(4) | 10000(5) |
| 5 | 00110(5) | 1011(4) | 10001(5) |
| 6 | 00111(5) | 110000(6) | 10010(5) |
| 7 | 0001000(7) | 110001(6) | 10011(5) |

Run-length coding represents runs of encoded symbols with a single representation of the symbol, followed by the count (run-length) of that symbol. Run lengths themselves may be entropy coded by any of the above mentioned methods, selection of which would depend on the underlying probability distribution.

SUMMARY OF THE INVENTION

In our co-pending U.S. patent application Ser. No. 12/693,220 entitled "Video Identification", the full contents of which are incorporated herein by cross-reference, we disclose a method whereby a multimedia fingerprint is made up of a coarse fingerprint (referred to as a "word histogram" in application Ser. No. 12/693,220) and a fine fingerprint (referred to as a "frame descriptor" in application Ser. No. 12/693,220). The temporal period of the coarse fingerprint represents the period of a plurality of fine fingerprints. In a typical search algorithm the coarse descriptors will be used to very quickly determine matching temporal regions with a low false alarm rate. The fine descriptors may then be used to carry out a more detailed search on the candidate temporal regions. Typically the overall size of the fine fingerprints for some multimedia content is significantly larger than that of the coarse fingerprints for the same content, e.g. the size ratio may typically be around 10:1. On the other hand, the fine fingerprints are accessed infrequently, namely only when the coarse fingerprints indicate a matching temporal region. It is therefore desirable to devise an efficient and flexible encoding scheme for multimedia fingerprints that will allow both significant compression of and easy access to its infrequently used parts.

The present application discloses an apparatus/method to efficiently and flexibly encode multimedia fingerprints. A corresponding decoding apparatus/method is also disclosed. The disclosed apparatus/method includes introducing compression of the fine descriptors. The technical advantage that this offers is a significantly reduced overall fingerprint size. It will be clear that this is very desirable, either reducing hardware costs or increasing the database sizes that can be practically used. To ensure that indexing and search speeds are not significantly increased, an efficient and low complexity encoding/decoding scheme is disclosed.

In general, the method includes efficient, flexible and fast coding of the larger and less frequently used parts of the signature, preferably according to a dynamically selected compression scheme, while leaving the smaller and more frequently used parts of the signature uncompressed. The coding scheme is designed to, on the one hand, result in a high compression ratio and, on the other hand, allow easy access and decoding of the encoded data.

In more detail, embodiments of the present invention provide a method and apparatus for multimedia signature coding, which realises efficient, flexible and fast coding of the larger and less frequently used parts of the descriptor, while leaving the smaller and more frequently used parts of the descriptor uncompressed;

on the one hand, results in a high compression ratio and, on the other hand, allows easy access and decoding of the encoded data;

decides which data to compress based on the processing of the un-encoded data, thus reducing decoding computational load to the minimum required;

allows more efficient storage and transmission of the multimedia signatures.

A multimedia content temporal interval (also referred to as a temporal segment or fragment), e.g. a video segment or audio segment, is described by a coarse fingerprint and a plurality of fine fingerprints, each fine fingerprint corresponding to a temporal sub-interval of said temporal interval, said temporal sub-interval typically being smaller than said temporal interval.

One or more fine fingerprints are encoded in a non-predictive way, with no reference to the temporally neighbouring signatures, and one or more fine fingerprints are encoded in a predictive way, from the temporally neighbouring signatures.

Preferably, the predictive encoding entails computing the difference between neighbouring fine fingerprints to make up a prediction difference matrix, scanning said prediction difference matrix into a one dimensional vector by vectorising along rows or along columns or along diagonals or along any suitable scanning pattern, and performing lossless encoding on the one dimensional vector by an appropriate method, preferably selected, at least in part, based on the scanning method used. However, it will be appreciated that other forms of predictive encoding can be used instead.

More specifically, according to the present invention, there is provided a digital content encoder operable to encode a temporal sequence of digital data, comprising:
a coarse digital fingerprint generator operable to generate a coarse digital fingerprint characterising the digital data in an interval of the temporal sequence;
a fine digital fingerprint generator operable to generate a plurality of fine digital fingerprints for the interval, each fine digital fingerprint characterising the digital data in a respective sub-interval of the interval; and
a predictive encoder operable to apply predictive encoding to a subset of the fine digital fingerprints for the interval.

The present invention also provides a digital content encoder operable to encode digital fingerprints for a temporal sequence of digital data, the digital fingerprints comprising a coarse digital fingerprint characterising the digital data in an interval of the temporal sequence, and a plurality of fine digital fingerprints for the interval, each fine digital fingerprint characterising the digital data in a respective sub-interval of the interval, the digital content encoder comprising:
a predictive encoder arranged to apply predictive encoding to at least one, but not all, of the fine digital fingerprints for the interval.

The present invention also provides a decoder operable to decode encoded digital content, the decoder comprising:
a receiver operable to receive encoded data for a temporal sequence of digital data, the encoded data comprising, for each of a plurality of intervals in the temporal sequence, a coarse digital fingerprint characterising the digital data in the interval, at least one fine digital fingerprint characterizing the digital data in a first sub-interval of the interval and being predictively encoded, and at least one fine digital fingerprint characterizing the digital data in a second sub-interval of the interval; and
a predictive decoder operable to decode the predictively encoded fine digital fingerprints.

The present invention also provides a search apparatus operable to search a database of encoded data for a temporal sequence of digital data, the encoded data comprising, for each of a plurality of intervals in the temporal sequence, a coarse digital fingerprint characterising the digital data in the interval, at least one fine digital fingerprint characterising the digital data in a first sub-interval of the interval and being predictively encoded, and at least one fine digital fingerprint characterising the digital data in a second sub-interval of the interval, the search apparatus comprising:
a fingerprint matcher operable to compare an input coarse digital fingerprint with the coarse digital fingerprints in the database to identify coarse digital fingerprints in the database that match the input coarse digital fingerprint; and
a decoder comprising:
a predictive decoder operable to decode the predictively encoded fine digital fingerprints;
wherein the decoder is arranged to decode the fine digital fingerprints only for an interval having a coarse digital fingerprint which matches the input coarse digital fingerprint.

The present invention also provides a method of encoding a temporal sequence of digital data, comprising:
generating a coarse digital fingerprint characterising the digital data in an interval of the temporal sequence;
generating a plurality of fine digital fingerprints for the interval, each fine digital fingerprint characterising the digital data in a respective sub-interval of the interval; and
applying predictive encoding to only a subset of the fine digital fingerprints for the interval.

The present invention also provides a method of encoding digital fingerprints for a temporal sequence of digital data, the digital fingerprints comprising a coarse digital fingerprint characterising the digital data in an interval of the temporal sequence, and a plurality of fine digital fingerprints for the interval, each fine digital fingerprint characterising the digital data in a respective sub-interval of the interval, the method comprising:
applying predictive encoding to at least one, but not all, of the fine digital fingerprints for the interval.

The present invention also provides a method of decoding encoded digital content, comprising:
receiving encoded data for a temporal sequence of digital data, the encoded data comprising, for each of a plurality of intervals in the temporal sequence, a coarse digital fingerprint characterising the digital data in the interval, at least one fine digital fingerprint characterizing the digital data in a first sub-interval of the interval and being predictively encoded, and at least one fine digital fingerprint characterizing the digital data in a second sub-interval of the interval; and
decoding the predictively encoded fine digital fingerprints.

The present invention also provides a method of searching a database of encoded data for a temporal sequence of digital data, the encoded data comprising, for each of a plurality of intervals in the temporal sequence, a coarse digital fingerprint characterising the digital data in the interval, at least one fine digital fingerprint characterising the digital data in a first sub-interval of the interval and being predictively encoded, and at least one fine digital fingerprint characterising the digital data in a second sub-interval of the interval, the method comprising:

a search process of comparing an input coarse digital fingerprint with the coarse digital fingerprints in the database to identify coarse digital fingerprints in the database that match the input coarse digital fingerprint; and a decoding process of:

decoding the predictively encoded fine digital fingerprint(s) for an interval;

wherein the decoding process is performed to decode the fine digital fingerprint(s) only for an interval having a coarse digital fingerprint which matches the input coarse digital fingerprint.

The present invention also provides a physically-embodied computer program storage device storing computer-readable programming instructions to program a programmable processing apparatus to become operable to perform an encoding method, a decoding method and/or a search method as set out above.

The present invention also provides a signal carrying computer-readable programming instructions to program a programmable processing apparatus to become operable to perform an encoding method, a decoding method and/or a search method as set out above.

The present invention further provides a record carrier carrying encoded data for a temporal sequence of digital data, the encoded data comprising, for each of a plurality of intervals in the temporal sequence, a coarse digital fingerprint characterising the digital data in the interval, at least one fine digital fingerprint characterizing the digital data in a first sub-interval of the interval and being predictively encoded, and at least one fine digital fingerprint characterizing the digital data in a second sub-interval of the interval.

The present invention yet further provides a signal carrying encoded data for a temporal sequence of digital data, the encoded data comprising, for each of a plurality of intervals in the temporal sequence, a coarse digital fingerprint characterising the digital data in the interval, at least one fine digital fingerprint characterizing the digital data in a first sub-interval of the interval and being predictively encoded, and at least one fine digital fingerprint characterizing the digital data in a second sub-interval of the interval.

BRIEF DESCRIPTION OF THE DRAWINGS

Embodiments of the present invention will now be described, by way of example only, with reference to the accompanying drawings, in which.

EMBODIMENTS

Figure 1:
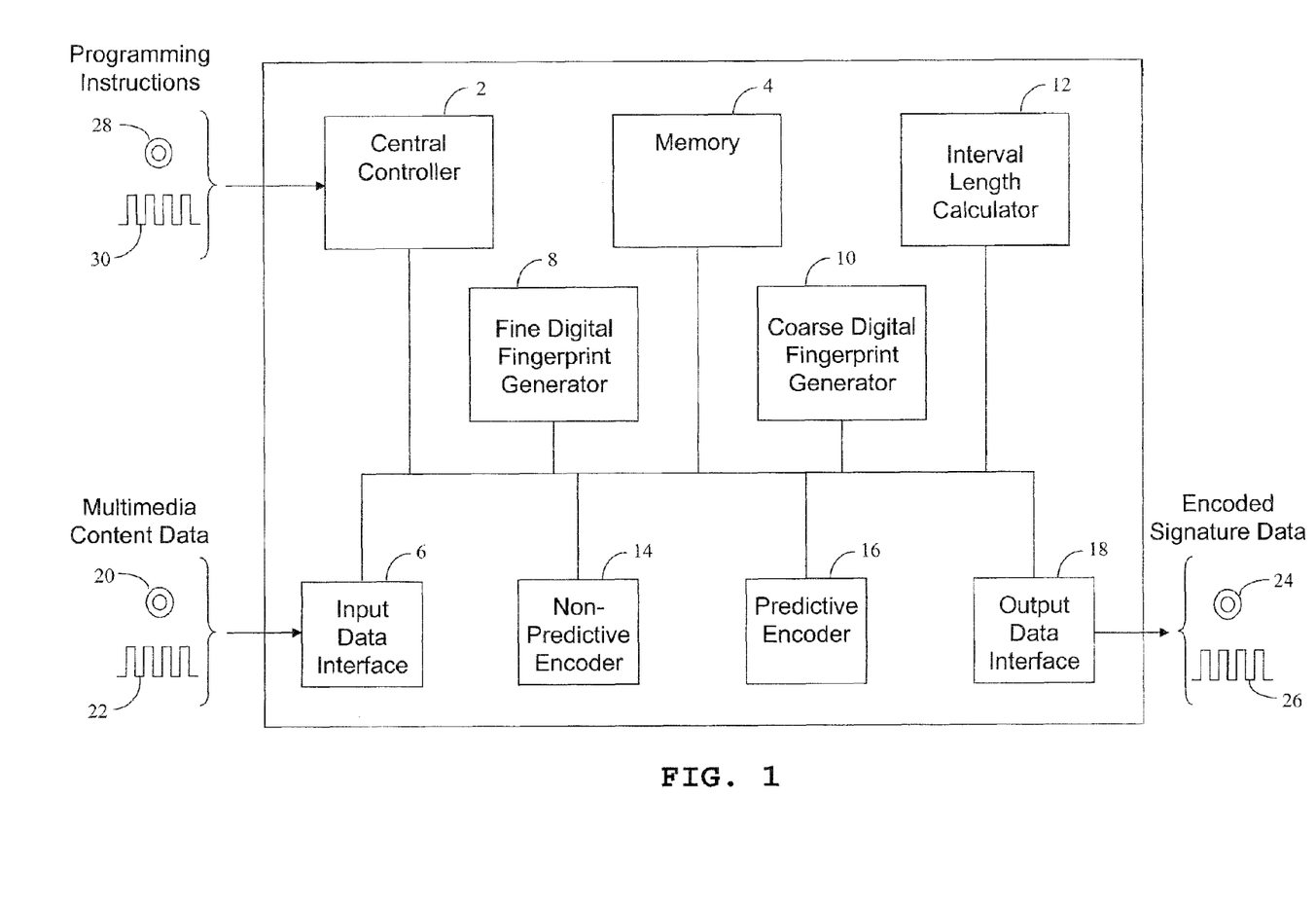
FIG. 1 shows a block diagram of an encoder apparatus in an embodiment.
Figure 2:
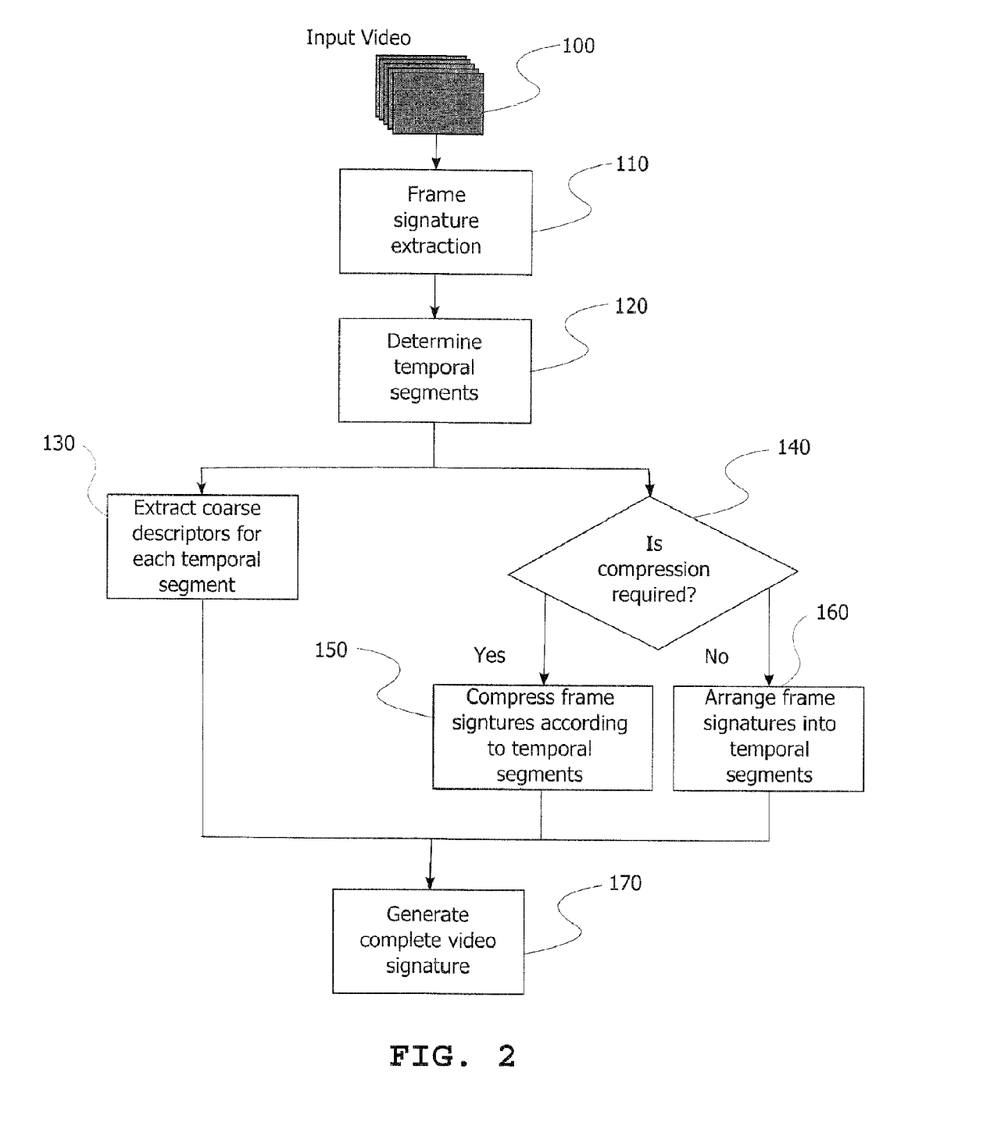
FIG. 2 shows a flow chart of the operations to encode digital signatures in an embodiment.

FIG. 1 shows a block diagram of an encoder apparatus in an embodiment, and FIG. 2 shows the processing operations performed by the apparatus to encode multimedia signatures.

Figure 3:
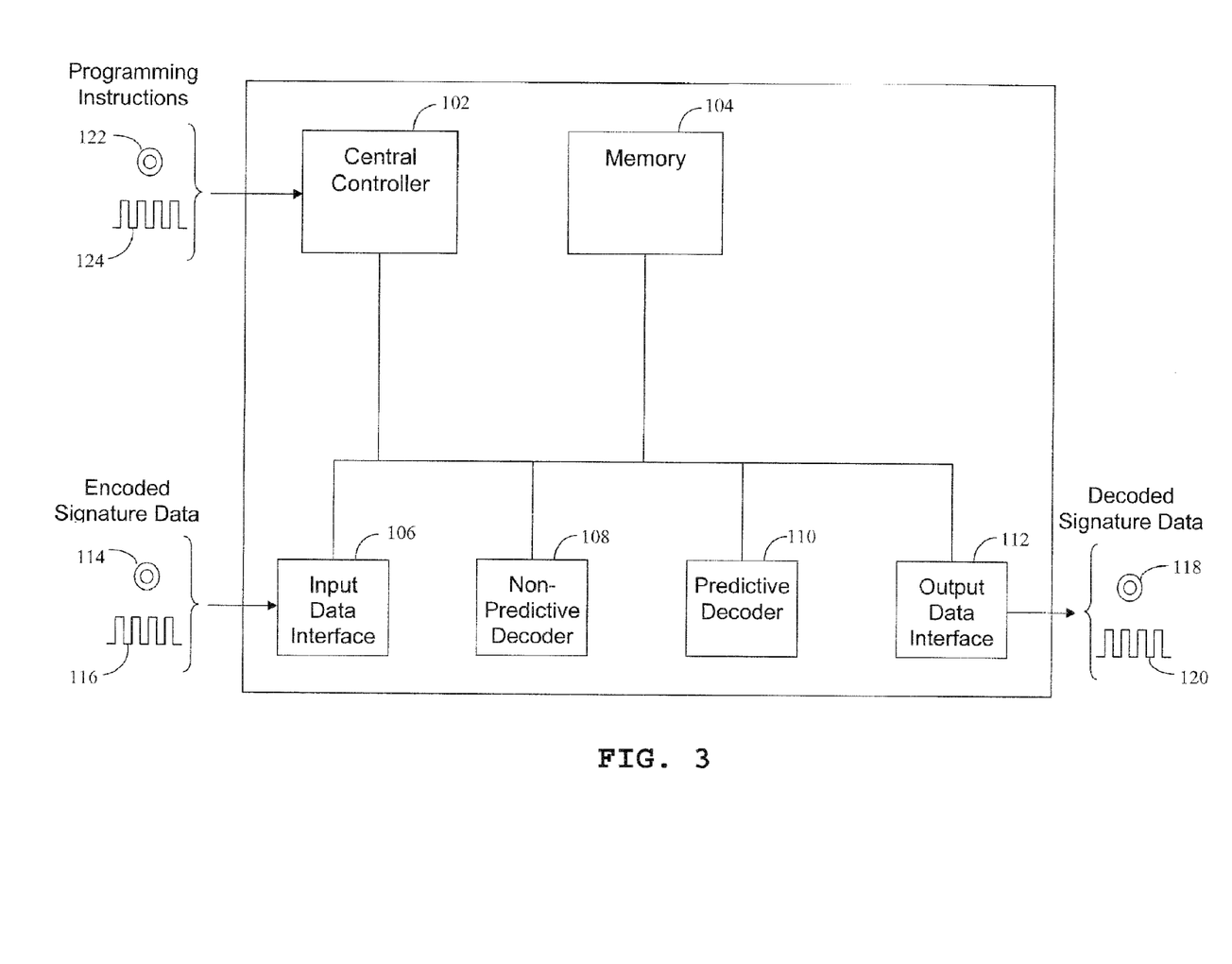
FIG. 3 shows a block diagram of a decoder apparatus in an embodiment.

FIG. 3 shows a block diagram of a decoder apparatus in an embodiment.

The apparatus shown in FIGS. 1 and 3 each comprise a programmable processing apparatus programmed to perform processing operations in accordance with computer program instructions. Accordingly, an embodiment of the invention comprises a computer program product such as a CD-ROM or other storage device (illustrated at 28 in FIG. 1 and at 122 in FIG. 3) or a signal (illustrated at 30 in FIG. 1 and at 124 in FIG. 3) supplying the computer program instructions to program the programmable processing apparatus. However, it will be appreciated that the components of the apparatus shown in FIG. 1 and/or FIG. 3 may alternatively be hardware components.

In the disclosed encoding method a multimedia content temporal interval (also referred to as a temporal segment of fragment), e.g. a video segment or audio segment, is described by a coarse fingerprint and a plurality fine fingerprints, each fine fingerprint corresponding to a temporal sub-interval of said temporal interval, said temporal sub-interval typically being smaller than said temporal interval.

For example, and without limitation, such a multimedia fingerprint extraction method is described in our previously referenced co-pending patent application Ser. No. 12/693,220 entitled "Video Identification", where a temporal video segment is described as a whole by a coarse fingerprint and a plurality of fine fingerprints, one for each frame of the temporal segment.

In order to extract the content signatures, a multimedia content may be divided into temporal segments of the same length or, alternatively, variable length segments may be used. For example, the variable length may be determined by detecting video or audio shot boundaries or significant changes.

In a preferred embodiment, the coarse fingerprints are extracted from the fine fingerprints. It is therefore possible, when variable length segments are used, to determine the temporal segments after extracting all fine descriptors from the multimedia content. In such an embodiment analysis of the fine descriptors may be used to determine suitable temporal segments.

In a preferred embodiment of the invention for a video signature, a video is divided into temporal segments and each temporal segment is described as a whole by a coarse fingerprint and a plurality of fine fingerprints, one for each frame or picture of the temporal segment. Fine fingerprints in a temporal segment are grouped into groups of pictures (GOPs).

In the preferred embodiment of the invention the required syntax for encoding a compressed representation of a temporal segment, denoted temporal_segment( ) is outlined in Table 2.

TABLE 2

Temporal_segment( ) syntax and decoder pseudocode

| | Description |
|---|---|
| num_pictures = 0<br>while (num_pictures < segment_length) {<br>   group_of_pictures( )<br>   num_pictures = num_pictures + pplen + 1<br>} | See table<br>group_of_pictures( ) |

Description of the Syntax Elements:
group_of_pictures( )—specifies group of pictures, composed of at least one coded picture fingerprint
segment_length—specifies the length of a temporal segment, in number of pictures. Specified in the higher level part of the multimedia signature syntax (defined for a temporal segment or constant for the whole content).

A key picture fingerprint is a picture fingerprint that is coded in a non-predictive way, with no reference to the temporally neighbouring pictures, and is denoted as KP. Predicted picture fingerprints are coded in a predictive way from the temporally neighbouring pictures, and are denoted as PP. A GOP is defined to be a set of picture fingerprints between two KPs, including the temporally first KP and all PPs before the next KP. A GOP therefore consists of a key picture and zero or more predicted pictures.

In the preferred embodiment of the invention, a picture fingerprint is a vector of M elements where each element takes N=3 possible values, i.e. elements are ternary numbers. The redundancy of information within a single key picture is very small, so compression is not applied to these picture fingerprints—encoding is done with a binary representation.

In the preferred embodiment of the invention two different binary representations of ternary fingerprints are considered:
1. Each consecutive 5 ternary elements are packed into one byte ($3^5=243<256=2^8$). For example, for M=340, for the whole picture fingerprint 8×340/5=544 bits are needed (68 bytes). Implementation of this method can be done easily with 8-bit arithmetic. This packing method is denoted as 5t→8b. As an another example, for M=384, for the whole picture fingerprint 8×380/5 (5t→8b)+7×4/4 (4t→37b)=615 bits are needed (76 bytes with 1 bit spare).
2. Each consecutive 17 ternary elements are packed into 27 bits ($3^{17}=129140163<134217728=2^{27}$). Packing into final string of bytes is accomplished by bit-shifting of the obtained 27 bits by the required amount of bits at the specific byte positions. For example, for M=340, 27×340/17=540, so this method saves 4 bits per picture, that may be used for transmitting additional information (e.g. flags). Since 27 bits are used in one conversion, a 32-bit arithmetic based implementation is possible. Having additional 4 bits is useful if byte-alignment is sought so that an all-zero difference vector in the current GOP can be signalled with no additional bytes spent. This packing method is denoted as 17t→27b. As another example, for M=384, for the whole picture fingerprint 27×374/17 (17t→27b)+8×10/5 (5t→8b)=610 bits are needed (76 bytes with 6 bits spare).

Alternatively, other binary representations are possible, where, depending on the number of ternary elements, a trade off between the efficiency of packing and complexity of implementation can be made. For instance, for M=290, ternary packing method 29t→46b may be used, with the saving of 4 bits compared to the 5t→8b packing.

In the following, the number of bits used for representation of KP is referred to as "KP bits", irrespectively of the packing method.

In the preferred embodiment of the invention the required syntax for encoding a compressed representation of a GOP, denoted group_of_pictures( ) is outlined in Table 3.

TABLE 3

Group_of_pictures( ) syntax and decoder pseudocode

| | Description |
|---|---|
| key_picture | KP bits |
| KP_GOP_flag | 1 bit |
| if (KP_GOP_flag == 0) { | |
|   last_GOP_flag | 1 bit |
|   if (last_GOP_flag == 1) { | |
|     pplen = segment_length − num_pictures − 1 | |
|   } else { | |
|     GOP_length_minus2 | 7 bits |
|     pplen = GOP_length_minus2 + 1 | |
|   } | |
|   nonzero_GOP_flag | 1 bit |
|   if (nonzero_GOP_flag == 1) { | |
|     predicted_pictures( ) | |
|   } | |
| } else { | |
|   pplen = 0 | |
| } | |

Description of the Syntax Elements:
key_picture—key picture packed into KP bits
KP_GOP_flag—when equal to 1 the current GOP consists of a single key picture (no predicted pictures in the GOP). Otherwise, when equal to 0, predicted pictures exist in the current GOP.
last_GOP_flag—when equal to 0 the current GOP is not last in the temporal segment. When equal to 1 the current GOP is last in the segment and its length is derived.
GOP_length_minus2—GOP length, in number of pictures, minus two pictures. For instance, GOP consisting of one KP and one PP has the value of this syntax element equal to 0.
nonzero_GOP_flag—when equal to 0, then all PPs, if they exist for the current GOP, are equal to KP and the decoding is skipped (KP is repeated pplen number of times). When equal to 1, then PPs are decoded.
predicted_pictures( )—part of the bit-stream with encoded PPs.

Figure 4:
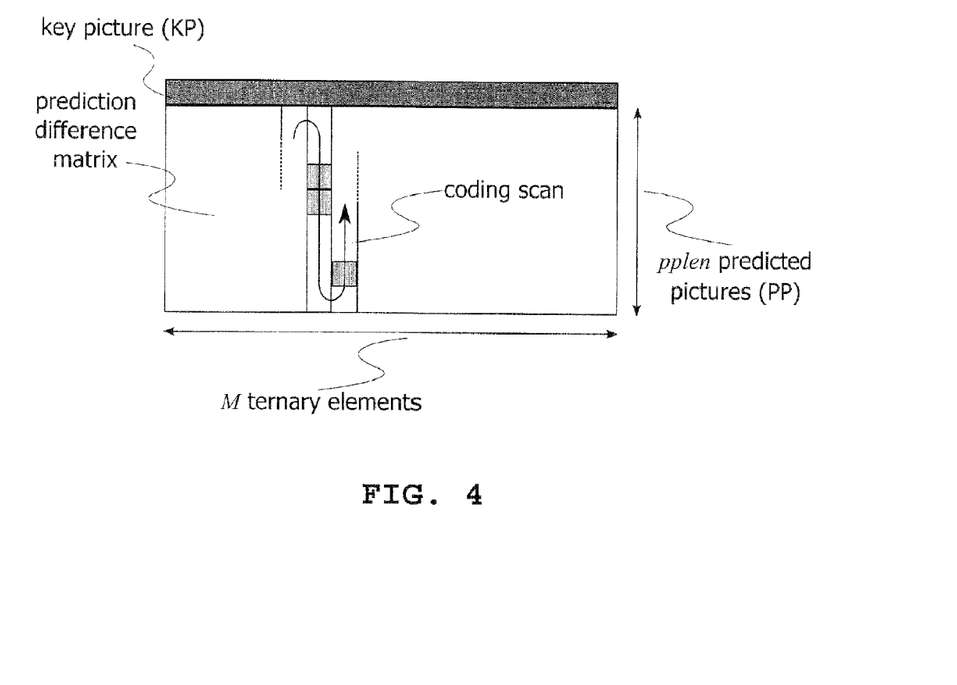
FIG. 4 illustrated a column scan of a prediction difference matrix in an embodiment.

In the preferred embodiment of the invention, predicted pictures are transformed by computing the modulo 3 difference between elements in the current and previous fingerprint. Such transformed, predicted pictures make up a prediction difference matrix, which is scanned into a one dimensional vector in a so-called "vectorisation" step. The vectorisation step, when done by concatenating the columns of the prediction difference matrix, exploits the fact that within one GOP some fingerprint positions are more likely not to change than the others, which leads to longer zero runs, i.e. a more compact representation. Other alternatives are concatenating rows of the prediction difference matrix, zig-zag scan, or any other scanning pattern. Depending on the choice of the vectorisation scanning pattern, a different choice for the entropy coding method may be made. This choice may be done dynamically within a video sequence depending on the statistics of the coded fingerprints. The structure of a GOP as coded (composed of a KP and PPs transformed into a prediction difference matrix) is depicted in FIG. 4. FIG. 4 illustrates a column scan of the prediction difference matrix but other scanning methods may be used, as discussed above.

Figure 7:
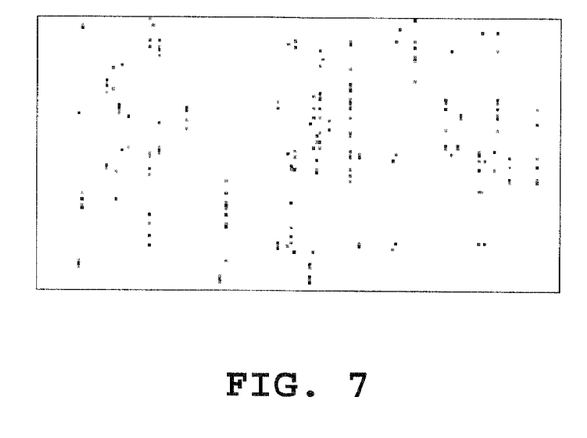
FIG. 7 and FIG. 8 show a comparison of 89×170 ternary values with 89×272 binary values.
Figure 8:
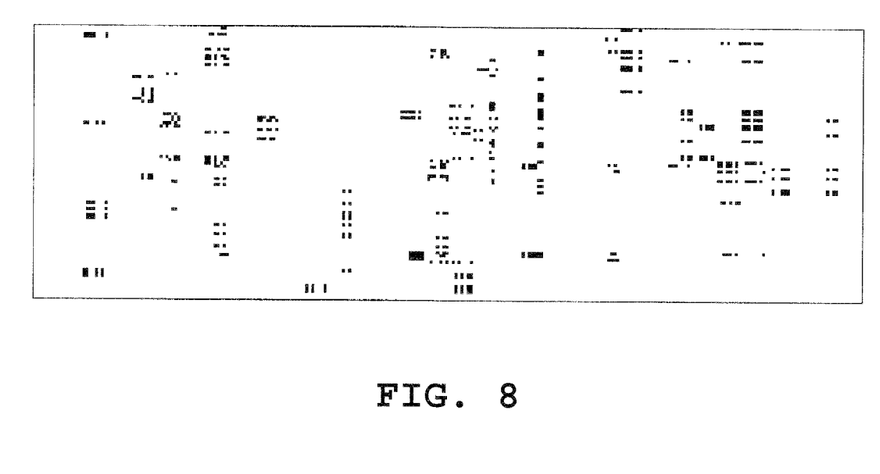

The ternary values are being used for generating the prediction difference since this implicitly decorrelates the byte-packed binary representation. This can be concluded by comparing the FIG. 7 (89×170 ternary values, where white represents ternary "0", grey ternary "1" and black ternary "2") and 8 (89×272 binary values, where white represents binary "0", and black binary "1"), where in FIG. 8 the intra-picture correlation is much higher than in FIG. 7, both representing the first half of the fingerprint elements in the same GOP.

The modulo 3 difference operation between ternary elements of the fingerprints results again in the three ternary symbols—"0", "1" and "2". The prediction difference matrix is thus composed of these three ternary symbols, which are coded differently:

ternary "1" and "2"—coded with one bit each, binary "0" for ternary "1" and binary "1" for ternary "2". After each ternary symbol, a run-length codeword for a run of zeros is inserted. If no zeros follow, a codeword for zero length is used.

ternary "0"—the ternary symbol is implicitly encoded as after each non-zero ternary symbol a zero run must follow.

In the preferred embodiment of the invention the required syntax for encoding a compressed representation of a the matrix of prediction differences, denoted predicted_pictures ( ), is outlined in Table 4.

TABLE 4

Predicted_pictures( ) syntax and decoder pseudocode

| | Description |
|---|---|
| decoded_el = 0 | |
| num_el = pplen × M | |
| while (decoded_el < num_el) { | |
|   zero_rle | exp-Golomb( ), variable bits |
|   decoded_el = decoded_el + zero_rle | |
|   if (decoded_el == num_el) then break | |
|   non_zero_symbol | 1 bit |
| } | |

Description of the Syntax Elements:
zero_rle—length of run of ternary "0", encoded using the exp-Golomb coding.
non_zero_symbol—when equal to 0 the current symbol is ternary "1". When equal to 1 the current symbol is ternary "2".

Figure 5:
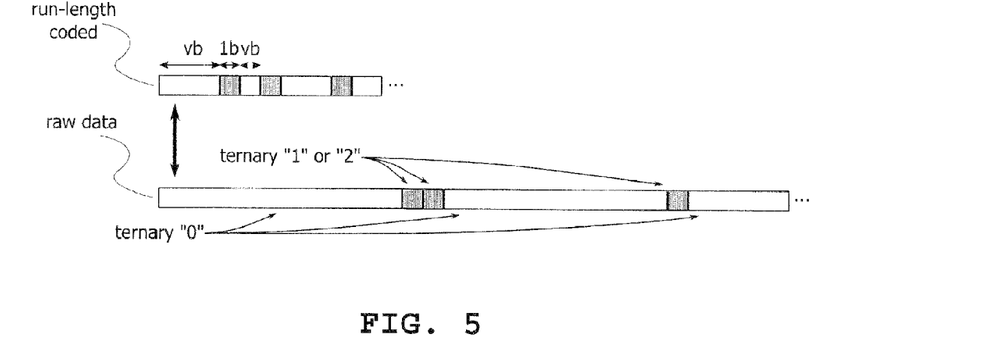
FIG. 5 illustrates a coding scheme of a vectorised prediction difference matrix in an embodiment.

This coding scheme of the vectorised prediction difference matrix, where "vb" refers to a variable number of bits, while "1b" refers to a length of one bit, is depicted in FIG. 5. However, this coding scheme is not unique. For example, two alternative methods for coding ternary symbols proceed as follows:

1. Zero-long run-lengths of zeros are not used, where individual non-zero symbols are encoded with a single bit, with additional single bit signalling the next symbol type (non-zero or zero).
2. Zero-long run-lengths of zeros are not used, where runs of non-zero symbols are encoded using the run length coding. Additionally, one bit is used for signalling the symbol of the next run.

Figure 6:
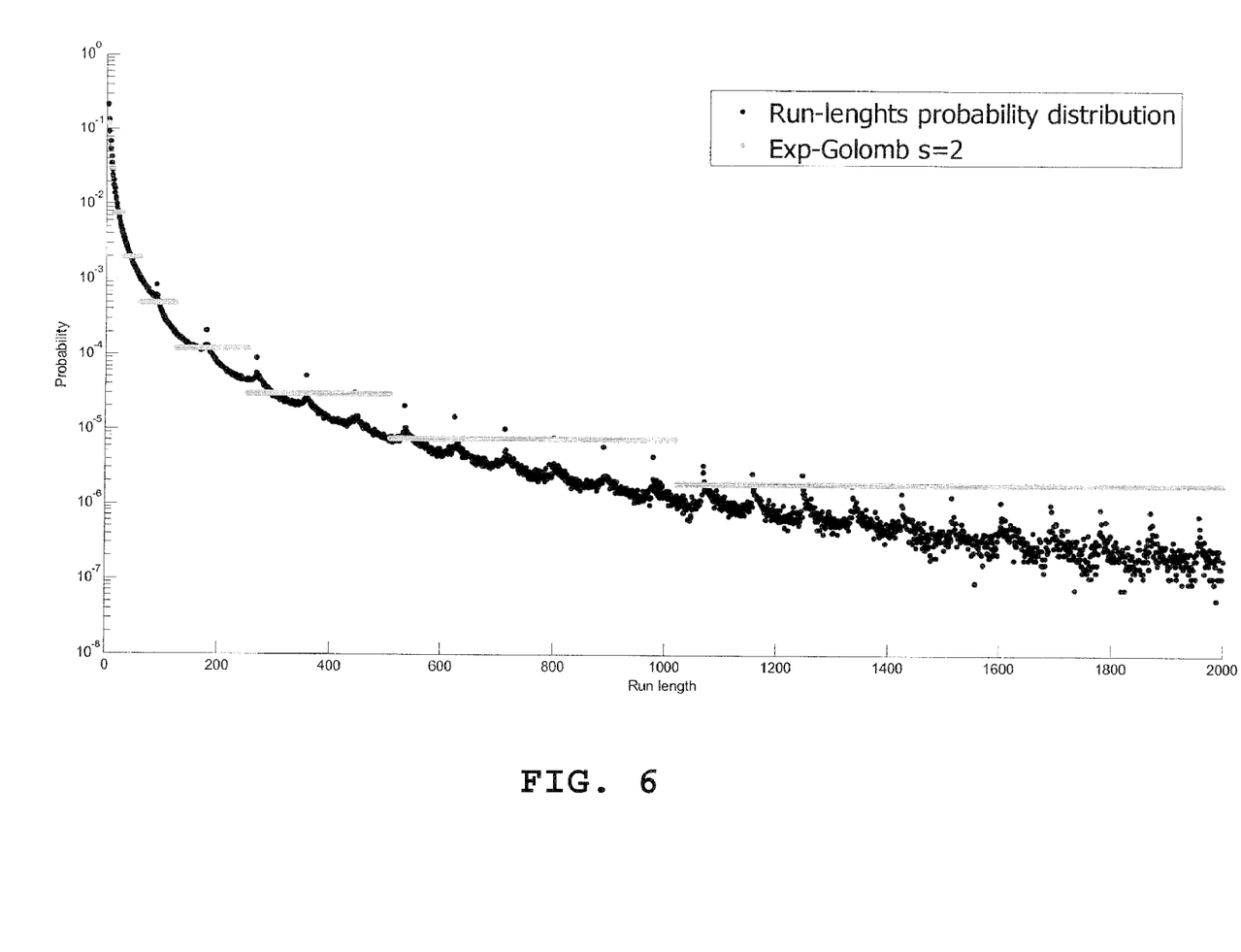
FIG. 6 illustrates how exp-Golomb codes are used in an embodiment to provide a good fit to zero run lengths that possess a distribution with a wide tail.

Zero run lengths possess a distribution with a wide tail (a wide-tail exponential or a power-law distribution), so in the preferred embodiment the exp-Golomb codes with parameter s=2 are used as they provide a good fit for that distribution and lead to a very low complexity implementation. This is shown in FIG. 6, which depicts the empirically obtained probability distribution of zero run lengths. In alternative embodiments of the invention, an adaptive Exp-Golomb scheme, where the parameter s is selected adaptively and that selection is encoded with the other parameters, can be used, or alternatively, some other suitable coding-scheme like Huffman or arithmetic coding may be used.

The requirement for encoders is that the resulting bit-streams conform to the syntax as outlined in the previous section. Thus, there is a multitude of possible encoding methods each potentially leading to different compression performance. In the following the preferred embodiment of the encoder is described.

1. Encode the picture fingerprints of each temporal segment independently of the other temporal segments.
2. Encode the first picture fingerprint of a segment as a KP.
3. Move forward one picture. If the current picture is the last picture in the segment, go to step 6.
4. Test the current picture for correlation with the previous, and if the test outcome indicates low correlation then encode the current picture fingerprint as a KP.
5. If in the step 4 a KP was not inserted then store the prediction difference in the prediction difference matrix, and go back to step 3, otherwise go to step 6. The prediction difference is obtained by a modulo 3 subtraction between the current and the previous picture fingerprints.
6. Encode all fingerprints from the previous KP to the last picture before the current picture as one GOP, by converting the stored prediction difference matrix to a vector (vectorisation step) and applying entropy coding on such a vector. At the beginning of a GOP encode all the required parameters, e.g. length of a GOP, entropy coding parameters, and so on. Optionally, the selection of vectorisation method and entropy coding is made, which is also encoded as a parameter.

The correlation test in step 4 may consist of a simple compression efficiency test where the prediction difference is coded with a run-length coder, and the bit-length of such data is then compared with the bit-length of a KP (KP bits). Another example is just by counting the ternary zeros in the difference picture and comparing it to a threshold.

In a preferred embodiment a flag is used to indicate the presence of compressed fine fingerprints, preferably a 1 bit flag is used. In the preferred embodiment a single compression flag is used for the fingerprint of an entire multimedia item comprising multiple temporal segments. In an alternative embodiment there may be a plurality of compression flags, one per temporal segment of the multimedia item, indicating the presence of compression for each segment of fine fingerprints. The compression flag allows the option not to use compression in cases where computational resources are significantly less than the storage/transmission resources. Furthermore within a system it may be desirable for the most frequently accessed content to be uncompressed with all other content compressed. This allows a more optimal balance of available computing resources (CPU time, memory size, hard disk bandwidth etc.) to be achieved. For example an index of the last 7 days TV may be stored in an uncompressed state whilst all older content is stored in a compressed state. It may also be desirable to store some of the fingerprint in a compressed format and some in an uncompressed format for a single piece of multimedia content.

In the preferred embodiment, when the compression flag is set to '1' the corresponding fine descriptors are compressed. When the compression flag is set to '0' no compression is applied to the corresponding fine descriptors.

The encoding may form a part of the extraction method or may be a separate method to be applied at any time, e.g. the fine fingerprints may be extracted and stored on a local system and then encoded prior to transmission over low-speed connection.

In an alternative embodiment of the invention, the coarse descriptors may also be compressed using predictive encoding or any other suitable encoding method. This will reduce the overall fingerprint size even further, but will also increase the computational complexity of using the signature, for example in a matching application.

In an alternative embodiment of the invention, KPs may be stored without any packing. For example, KPs comprising ternary values may be stored in a "raw" format using two bits per pixel. This will result in a small increase of the overall signature size, but will also reduce the overall complexity of decoding the fine signature blocks.

Furthermore, the characteristics of the compressed blocks of fine signatures may also be used for the fast matching of temporal segments, in addition to the coarse signatures. Such characteristics include the absolute and relative positions of the KPs (key pictures), statistics of zero runs such as mean and maximum, etc.

Search speeds are very important for many multimedia fingerprint applications. For this reason it is very important that the compression scheme is efficient. The compression scheme outlined here achieves the goal of low complexity.

The invention claimed is:

1. A digital content encoder operable to encode a temporal sequence of digital data, comprising:
   a coarse digital fingerprint generator operable to generate a coarse digital fingerprint characterising the digital data in an interval of the temporal sequence;
   a fine digital fingerprint generator operable to generate a plurality of fine digital fingerprints for the interval, each fine digital fingerprint characterising the digital data in a respective sub-interval of the interval; and
   an encoder that selects whether or not to compress only the fine digital fingerprints,
   wherein the compression of the fine digital fingerprints is carried out by
      computing a modulo 3 difference between the fine digital fingerprints and a temporal neighbor fine digital fingerprint for the interval to generate a prediction difference matrix,
      column scanning the prediction difference matrix to form a vector, and
      encoding the vector.

2. The digital content encoder of claim 1, wherein:
   the coarse digital fingerprint generator generates a coarse digital fingerprint that is not predictively encoded; and
   the encoder being a predictive encoder operable to apply predictive encoding to the fine digital fingerprints for the interval.

3. The digital content encoder according to claim 2, further comprising:
   a non-predictive encoder operable to apply non-predictive encoding to at least one of the fine digital fingerprints for the interval.

4. A digital content encoder according to claim 3, wherein: the fine digital fingerprint generator is operable to generate each of the fine digital fingerprints as a vector of ternary values; and
   the non-predictive encoder is operable to apply the non-predictive encoding to a fine digital fingerprint by generating a binary representation of the vector of ternary values for the fine digital fingerprint.

5. A digital content encoder according to claim 2, wherein:
   the digital content encoder is operable to encode a temporal sequence of pictures;
   the digital content encoder further comprises a key picture designator operable to designate pictures within the sequence as key pictures; and
   the predictive encoder is operable to apply the predictive encoding to the fine digital fingerprints of non-key pictures.

6. A digital content encoder according to claim 2, wherein the coarse fingerprint generator is operable to generate the coarse fingerprint for the interval from the fine fingerprints for the interval.

7. A digital content encoder according to claim 2, wherein the digital content encoder is operable to generate coarse and fine digital fingerprints and perform encoding for intervals of different lengths.

8. A digital content encoder according to claim 7, further comprising an interval length calculator operable to calculate the respective lengths of the intervals in dependence upon the fine digital fingerprints.

9. A digital content encoder according to claim 2, wherein:
   the fine digital fingerprint generator is operable to generate each of the fine digital fingerprints as a vector of ternary values;
   the predictive encoder is operable to apply predictive encoding to a fine digital fingerprint by:
      performing encoding of the vector such that ternary values "1" and "2" are encoded with one bit and ternary value "0" is implicitly encoded using a zero run.

10. A decoder operable to decode encoded digital content, the decoder comprising:
    a receiver operable to receive encoded data for a temporal sequence of digital data, the encoded data comprising, for each of a plurality of intervals in the temporal sequence, a coarse digital fingerprint that is not predictively encoded, the coarse digital fingerprint characterizing the digital data in the interval, and a plurality of fine digital fingerprints each characterizing the digital data in a respective sub-interval of the interval, of the fine digital fingerprints being predictively encoded; and
    a predictive decoder operable to decode the predictively encoded fine digital fingerprints by
    decoding the received predictively encoded data to generate a vector;
    placing a plurality of values from the vector into a prediction difference matrix, each of the values being an element of the vector; and
    combining the prediction difference matrix with a previously decoded fine digital fingerprint to reconstruct the fine digital fingerprint being decoded.

11. A decoder according to claim 10, wherein:
    the receiver is operable to receive encoded data in which at least one fine digital fingerprint for each interval is non-predictively encoded; and
    the decoder further comprises a non-predictive decoder operable to decode the non-predictively encoded fine digital fingerprints.

12. A decoder according to claim 11, wherein:
    the receiver is operable to receive encoded data in which the non-predictively encoded fine digital fingerprints comprise binary representations of ternary values; and
    the non-predictive decoder is operable to decode the binary representations to generate the ternary values.

13. A decoder according to claim 10, wherein the decoder is operable to receive and decode encoded data for intervals of different lengths.

14. A decoder according to claim 10, wherein the predictive decoder is operable to combine the prediction difference matrix with a previously decoded fine digital fingerprint by performing modulo 3 addition thereof.

15. A search apparatus operable to search a database of encoded data for a temporal sequence of digital data, the encoded data comprising, for each of a plurality of intervals in the temporal sequence, a coarse digital fingerprint that is not predictively encoded, the coarse digital fingerprint characterizing the digital data in the interval, and a plurality of fine digital fingerprints each characterising the digital data in a respective sub-interval of the interval and the fine digital fingerprints being predictively encoded, wherein the encoded data for each interval comprises at least one fine digital fingerprint that is non-predictively encoded and that comprises binary representations of ternary values, the search apparatus comprising:
 a fingerprint matcher operable to compare an input coarse digital fingerprint with the coarse digital fingerprints in the database to identify coarse digital fingerprints in the database that match the input coarse digital fingerprint; and
 a decoder comprising:
  a predictive decoder operable to decode the predictively encoded fine digital fingerprints; and
  a non-predictive decoder operable to decode the non-predictively encoded fine digital fingerprints by decoding the binary representations to generate the ternary values;
 wherein:
 the decoder is arranged to decode the fine digital fingerprints only for an interval having a coarse digital fingerprint which matches the input coarse digital fingerprint; and
 the predictive decoder is operable to decode each predictively encoded fine digital fingerprint by:
  decoding the received predictively encoded data to generate a vector;
  placing the values from the vector into a prediction difference matrix; and
  combining the prediction difference matrix with a previously decoded fine digital fingerprint by performing modulo 3 addition thereof to reconstruct the fine digital fingerprint being decoded.

16. A method of encoding a temporal sequence of digital data, comprising:
 generating a coarse digital fingerprint characterising the digital data in an interval of the temporal sequence;
 generating a plurality of fine digital fingerprints for the interval, each fine digital fingerprint characterising the digital data in a respective sub-interval of the interval;
 selecting whether or not to compress only the fine digital fingerprints such that the fine digital fingerprints are compression encoded in response to a selection to compress; and
 applying non-compression encoding to at least one fine digital fingerprint;
 wherein the compression of the fine digital fingerprints is carried out by
  computing a modulo 3 difference between the fine digital fingerprints and a temporal neighbor fine digital fingerprint for the interval to generate a prediction difference matrix,
  column scanning the prediction difference matrix to form a vector, and
  encoding the vector.

17. The method of claim 16, wherein:
 generating a coarse digital fingerprint includes generating a coarse digital fingerprint that is not predictively encoded;
 and
 the method further comprising predictively encoding the fine digital fingerprints for the interval.

18. The method according to claim 17, further comprising:
 non-predictively encoding at least one of the fine digital fingerprints for the interval.

19. A method according to claim 18, wherein:
 each of the fine digital fingerprints is generated as a vector of ternary values; and
 the non-predictive encoding of a fine digital fingerprint comprises generating a binary representation of the vector of ternary values for the fine digital fingerprint.

20. A method according to claim 17, wherein:
 the temporal sequence comprises a temporal sequence of pictures;
 the method further comprises designating pictures within the sequence as key pictures; and
 the fine digital fingerprints of the non-key pictures are predictively encoded.

21. A method according to claim 17, wherein the coarse fingerprint for the interval is generated from the fine fingerprints for the interval.

22. A method according to claim 17, wherein the processing is repeated to generate and encode coarse and fine digital fingerprints for intervals of different lengths.

23. A method according to claim 22, further comprising calculating the respective lengths of the intervals in dependence upon the fine digital fingerprints.

24. A method according to claim 17, wherein:
 each of the fine digital fingerprints is generated as a vector of ternary values; and
 the predictive encoding of a fine digital fingerprint comprises:
  scanning the prediction difference matrix with the selected type of scan to form a vector as a vector of ternary values;
 and
 performing encoding of the one-dimensional vector with the such that ternary values "1" and "2" are encoded with one bit and ternary value "0" is implicitly encoded using a zero run.

25. A method of decoding encoded digital content, the method comprising:
 receiving encoded data for a temporal sequence of digital data, the encoded data comprising, for each of a plurality of intervals in the temporal sequence, a coarse digital fingerprint that is not predictively encoded, the coarse digital fingerprint characterising the digital data in the interval, and a plurality of fine digital fingerprints each characterizing the digital data in a respective sub-interval of the interval, the fine digital fingerprints being predictively encoded; and
 decoding the predictively encoded fine digital fingerprints by
  decoding the received predictively encoded data to generate a vector;
  placing a plurality of values from the vector into a prediction difference matrix, each of the values being an element of the vector; and combining the prediction difference matrix with a previously decoded fine digital fingerprint to reconstruct the fine digital fingerprint being decoded.

26. A method according to claim 25, wherein:
encoded data is received in which at least one fine digital fingerprint for each interval is non-predictively encoded; and
the method further comprises decoding the non-predictively encoded fine digital fingerprints.

27. A method according to claim 26, wherein:
in the received encoded data, the non-predictively encoded fine digital fingerprints comprise binary representations of ternary values; and
the non-predictive decoding comprises decoding the binary representations to generate the ternary values.

28. A method according to claim 25, wherein encoded data for intervals of different lengths is received and decoded.

29. A method according to claim 25, wherein the prediction difference matrix is combined with a previously decoded fine digital fingerprint by performing modulo 3 addition thereof.

30. A method of searching a database of encoded data for a temporal sequence of digital data, the encoded data comprising, for each of a plurality of intervals in the temporal sequence, a coarse digital fingerprint that is not predictively encoded, the coarse digital fingerprint characterising the digital data in the interval, and a plurality of fine digital fingerprints each characterising the digital data in a respective sub-interval of the interval and the fine digital fingerprints being predictively encoded, wherein the encoded data for each interval comprises at least one fine digital fingerprint that is non-predictively encoded and that comprises binary representations of ternary values, the method comprising:
a matching process of comparing an input coarse digital fingerprint with the coarse digital fingerprints in the database to identify coarse digital fingerprints in the database that match the input coarse digital fingerprint; and
a decoding process comprising:
predictively decoding the predictively encoded fine digital fingerprints; and
decoding the non-predictively encoded fine digital fingerprints by decoding the binary representations to generate the ternary values;
wherein:
the decoding process decodes the fine digital fingerprints only for an interval having a coarse digital fingerprint which matches the input coarse digital fingerprint; and
each predictively encoded fine digital fingerprint is decoded by:
decoding the received predictively encoded data to generate a vector;
placing the values from the vector into a prediction difference matrix; and
combining the prediction difference matrix with a previously decoded fine digital fingerprint by performing modulo 3 addition thereof to reconstruct the fine digital fingerprint being decoded.

31. A non-transitory computer-readable storage medium storing computer program instructions which, when executed, cause a processing apparatus to perform a method of encoding a temporal sequence of digital data, comprising:
generating a coarse digital fingerprint characterising the digital data in an interval of the temporal sequence;
generating a plurality of fine digital fingerprints for the interval, each fine digital fingerprint characterising the digital data in a respective sub-interval of the interval;
selecting whether or not to compress only the fine digital fingerprints such that the fine digital fingerprints are compression encoded in response to a selection to compress; and
applying non-compression encoding to at least one fine digital fingerprint;
wherein the compression of the fine digital fingerprints is carried out by
computing a modulo 3 difference between the fine digital fingerprints and a temporal neighbor fine digital fingerprint for the interval to generate a prediction difference matrix,
column scanning the prediction difference matrix to form a vector, and
encoding the vector.

32. The encoder of claim 1, where the coarse digital fingerprint represents the interval of the plurality of fine digital fingerprints.

33. The encoder of claim 1, where a data size of a fine digital fingerprint for the digital data in a sub-interval of the interval is larger than a data size of the coarse digital fingerprint for the digital data in the interval of the temporal sequence.

34. The method of claim 16, where the coarse digital fingerprint represents the interval of the plurality of fine digital fingerprints.

35. The method of claim 16, where a data size of a fine digital fingerprint for the digital data in a sub-interval of the interval is larger than a data size of the coarse digital fingerprint for the digital data in the interval of the temporal sequence.

* * * * *